R. O. Lowrey,
Bed Bottom.
No. 87,948. Patented Mar. 16, 1869.
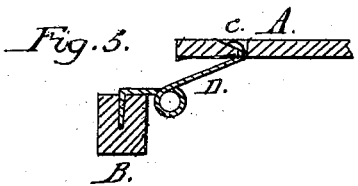
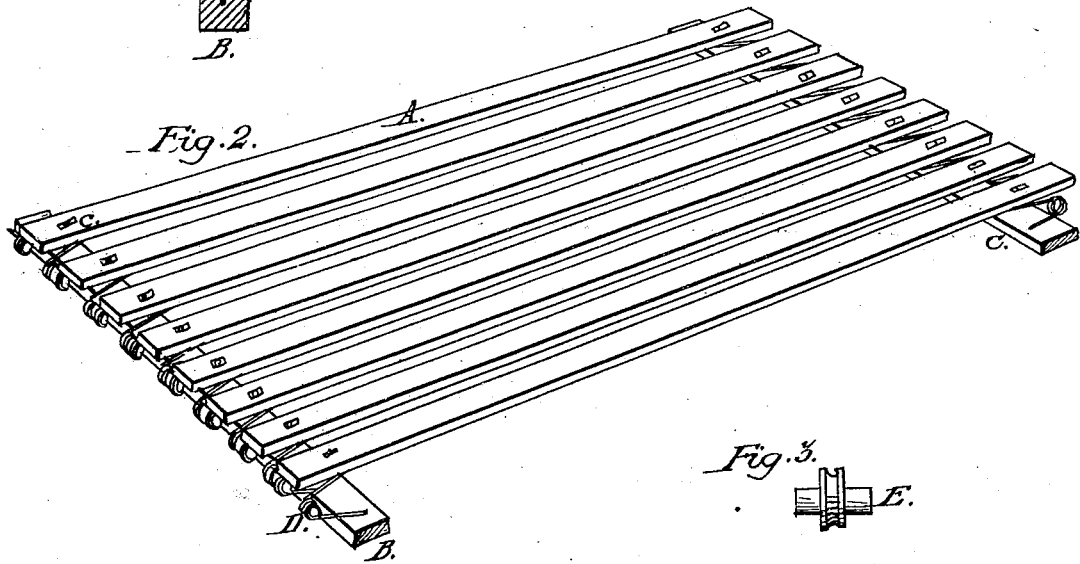
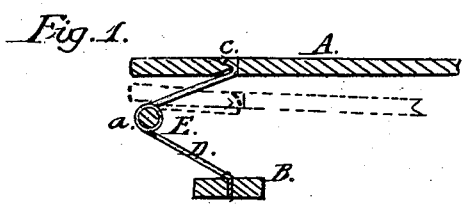
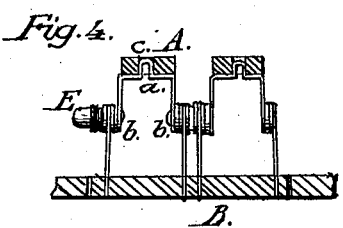
Witnesses:
L. Hailey
P. F. Dodge
Inventor:
R. O. Lowrey
by Dodge & Munn
Atty

R. O. LOWREY, OF SALEM, NEW YORK.

Letters Patent No. 87,948, dated March 16, 1869.

IMPROVED BED-BOTTOM. REISSUED

The Schedule referred to in these Letters Patent and making part of the same.

*To all whom it may concern:*

Be it known that I, R. O. LOWREY, of Salem, in the county of Washington, and State of New York, have invented certain new and useful Improvements in Spring-Bed Bottoms; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to spring-bed bottoms, and consists in new and certain improvements in the bed-bottom for which Letters Patent, No. 74,388, were granted me, February 11, 1868.

By means of these improvements I am able to produce a better construction and arrangement of the springs and slats, and to make a more elastic, durable, and cheap spring-bed bottom.

In the drawings—

Figure 1 is a sectional view of a part detached, showing the forms of the springs, and the mode of connecting them with the cross-pieces and slats;

Figure 2 is a perspective view;

Figure 3 is a view of a part detached;

Figure 4 is an end view of a part detached, and partly in section; and

Figure 5 is a view of a modification of the spring.

I construct my bed-bottom of a series of longitudinal slats, A, which I connect with two flat cross-pieces, B and C, by wire springs D, arranged as clearly shown in fig. 2.

Each of the slats A, I provide with two springs, D, one at each end.

These springs D, I make of any kind of wire having suitable elasticity and strength, and form them as clearly shown in figs. 1 and 4, or in the modified form shown in fig. 5.

Each of these springs I make of a single piece of wire, bending the central portion as shown in fig. 4, so as to form a hook, $a$, and the legs or sides, so as to form coils $b$, and the ends, so that they may be conveniently attached to the cross-pieces B and C, as shown in figs. 1, 2, and 4.

Near each end of these slats A, I cut a hole, $c$, which may be square or oblong, and of proper size to permit the hook $a$ of the spring to be inserted therein, as represented in fig. 1.

The edge of the bar, on that side of the hole nearest the end of the slats, is cut away, or bevelled from each side toward the centre of the slat, as shown more clearly in fig. 5, thus forming a recess, in which the point of the hook $a$ rests, so as not to be thrown above the surface of the slat, and which also permits the slat, when bent, or sagged by use, to be turned over, and used with equal facility, the other side up.

This shaped opening makes a better bearing for the hooks $a$, allows an easier and freer motion of the slats and springs, and, by letting the hooks $a$ rest a little below the surface of the slats, they do not rub against and wear holes in the ticking of the bed.

The springs D, I so arrange on the cross-bars B and C, and connect them with the slats A, that when in their natural position, their hooks $a$ will be a little in the rear of the vertical plane passing through their points of connection with the cross-bars, and when pressed down, will be a little in front of it.

The coils $b$ of the springs D, are so made as to be all in a line when the springs are attached to the cross-bars.

Between these coils $b$, I insert blocks E, with their ends entering in the coils.

These blocks E are formed and shaped as shown in fig. 3, and arranged as shown in figs. 2 and 4. They serve to connect and hold the springs D in position, without interfering with their moving independently of each other.

The legs or sides of the springs D are set far enough apart to permit the ends of the slats A, to which they are connected, to pass between them when pressed down, as shown in red lines in fig. 1.

It is obvious that these hooks D may be modified in form, and connected with the cross-bars and slats, as shown in fig. 5, but I prefer to make and arrange them as in figs. 1, 2, and 4.

In this way I am able to make a complete bed-bottom, as shown in fig. 2, which can be readily and conveniently inserted within the frame of a bedstead.

It is simple, compact, and durable; each slat moves independent of the other, and in the event of either of the slats becoming bent or sprung, it can be easily turned over, or if broken, can be conveniently removed, and another put in its place.

In my former patent, mentioned above, the springs at the head are stiffer than those at the foot. This peculiarity I preserve in my present construction.

My present improvement consists, principally, in arranging the springs on two cross-pieces, and in such a way that there will be no necessity of attaching the cross-pieces together by longitudinal pieces, and in providing the slats with wedge-shaped openings, and the springs with connecting and supporting-blocks.

Having thus described my invention,

What I claim, is—

1. The slats A, having the holes $c$, with recesses for the points of the hooks to rest in, substantially as shown and described.

2. Connecting the adjoining springs of the series by means of the blocks E, constructed and applied as shown and described.

R. O. LOWREY.

Witnesses:
H. B. MUNN,
P. T. DODGE.